United States Patent
Cormie

(10) Patent No.: US 11,276,086 B2
(45) Date of Patent: *Mar. 15, 2022

(54) CLIENT-SIDE VIDEO ADVERTISEMENT REPLACEMENT USING AUTOMATIC CONTENT RECOGNITION

(71) Applicant: Roku, Inc., San Jose, CA (US)

(72) Inventor: Steven M. Cormie, Cambridge (GB)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,087

(22) Filed: Jul. 15, 2020

(65) Prior Publication Data

US 2020/0349612 A1 Nov. 5, 2020

Related U.S. Application Data

(63) Continuation of application No. 16/395,509, filed on Apr. 26, 2019, now Pat. No. 10,810,629, which is a continuation of application No. 14/468,080, filed on Aug. 25, 2014, now Pat. No. 10,825,056.

(60) Provisional application No. 61/981,045, filed on Apr. 17, 2014.

(51) Int. Cl.
*G06Q 30/02* (2012.01)
*H04N 21/234* (2011.01)
*H04N 21/81* (2011.01)
*H04L 67/1095* (2022.01)

(52) U.S. Cl.
CPC ..... *G06Q 30/0269* (2013.01); *G06Q 30/0261* (2013.01); *H04L 67/1095* (2013.01); *H04N 21/23424* (2013.01); *H04N 21/812* (2013.01)

(58) Field of Classification Search
CPC ........... G06Q 30/0261; G06Q 30/0269; H04L 67/1095; H04N 21/23424; H04N 21/812
See application file for complete search history.

(56) References Cited

U.S. PATENT DOCUMENTS

| 6,909,837 | B1 | 6/2005 | Unger |
| 7,444,659 | B2 | 10/2008 | Lemmons |
| 7,546,619 | B2 | 6/2009 | Anderson et al. |

(Continued)

FOREIGN PATENT DOCUMENTS

| AU | 2007257685 A1 | 12/2007 |
| CN | 102075695 A | 5/2011 |

(Continued)

OTHER PUBLICATIONS

Office Action dated Sep. 24, 2019 in U.S. Appl. No. 16/395,509.

(Continued)

*Primary Examiner* — Yassin Alata
(74) *Attorney, Agent, or Firm* — McDonnell Boehnen Hulbert & Berghoff LLP

(57) ABSTRACT

Systems and method for advertisement replacement are disclosed. A server may receive a server feed, generate a plurality of server fingerprints for a respective plurality of segments of the server feed, receive a synchronization message comprising a client fingerprint and a client time, match the client fingerprint with one of the plurality of server fingerprints, and send a synchronization response indicative of a server time associated with the one of the plurality of server fingerprints.

19 Claims, 5 Drawing Sheets

(56) References Cited

U.S. PATENT DOCUMENTS

| | | |
|---|---|---|
| 10,810,629 B2 | 10/2020 | Cormie |
| 10,825,056 B1 | 11/2020 | Cormie |
| 2003/0226150 A1 | 12/2003 | Berberet et al. |
| 2003/0229900 A1 | 12/2003 | Reisman |
| 2004/0010729 A1 | 1/2004 | Lockridge et al. |
| 2008/0098042 A1 | 4/2008 | Tian et al. |
| 2009/0003432 A1 | 1/2009 | Liu et al. |
| 2009/0157802 A1 | 6/2009 | Kang et al. |
| 2012/0192227 A1 | 7/2012 | Fleischman et al. |
| 2013/0014171 A1 | 1/2013 | Sansom et al. |
| 2013/0031582 A1 | 1/2013 | Tinsman et al. |
| 2013/0120662 A1* | 5/2013 | Houdaille ........ H04N 21/23424 348/705 |
| 2013/0173826 A1 | 7/2013 | Kim et al. |
| 2013/0205315 A1 | 8/2013 | Sinha et al. |
| 2013/0205335 A1 | 8/2013 | Sinha et al. |
| 2013/0326082 A1 | 12/2013 | Stokking et al. |
| 2014/0007157 A1 | 1/2014 | Harrison et al. |
| 2014/0007162 A1 | 1/2014 | Harrison |
| 2014/0020013 A1* | 1/2014 | DiLorenzo ......... H04N 21/4316 725/32 |
| 2014/0074621 A1 | 3/2014 | Chai et al. |
| 2014/0115627 A1 | 4/2014 | Lee et al. |
| 2014/0196085 A1* | 7/2014 | Dunker ............ H04N 21/23424 725/36 |
| 2014/0201769 A1* | 7/2014 | Neumeier ............ H04N 21/235 725/14 |
| 2016/0037217 A1 | 2/2016 | Harmon et al. |

FOREIGN PATENT DOCUMENTS

| | | |
|---|---|---|
| KR | 20070066885 A | 6/2007 |
| WO | 2007146961 A2 | 12/2007 |
| WO | 2011000502 A1 | 1/2011 |

OTHER PUBLICATIONS

Office Action dated Feb. 6, 2020 in U.S. Appl. No. 16/395,509.

San Pedro Wandelmer, Jose and Sergio Dominguez Cabrerizo, "Synchronized digital video subsampling to achieve temporal resolution independence", IEEE International Symposium on Industrial Electronics, 1785-90, 2007.

Martin Lopez-Nores et al., "MISPOT: Dynamic Product Placement for Digital TV through MPEG-4 Processing and Semantic Reasoning," Knowl Inf Syst, Mar. 26, 2009, pp. 101-128, vol. 22, Springer-Verlag London Limited, London, England.

Kongwah Wan et al., "Automatic Sports Content Analysis—State-of-the-Art and Recent Results," Institute for Infocomm Research, May 12, 2005, 7 pages, Singapore.

No Author, Gracenote Takes on Targeted Advertising, Gracenote.com Events, Retrieved from the Internet on Nov. 6, 2014, 3 pages, World Wide Web, http://www.gracenote.com/events/targeted_advertising/.

Office Action dated Feb. 4, 2020 in U.S. Appl. No. 14/468,080.

* cited by examiner

CLIENT-SIDE VIDEO ADVERTISEMENT REPLACEMENT USING AUTOMATIC CONTENT RECOGNITION

CROSS-REFERENCE TO RELATED APPLICATIONS

This application is a continuation of U.S. patent application Ser. No. 16/395,509, filed Apr. 26, 2019, which is a continuation of U.S. patent application Ser. No. 14/468,080, filed Aug. 25, 2014, which claims priority to U.S. Provisional Patent App. No. 61/981,045, filed on Apr. 17, 2014. The foregoing applications are hereby incorporated by reference herein.

TECHNICAL FIELD

Embodiments described herein generally relate to video advertisement replacement.

BACKGROUND

Content feeds may be generated at a central location and distributed to a variety of locations. For example, a television channel may be distributed from a content provider to number of local broadcasters. The content feed may include advertisements or spaces within the content feed for advertisements to be added. It may be advantageous to replace the advertisements (or fill the spaces) with advertisements that are targeted to a particular location or viewer.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

A content provider may generate a content feed including advertisements or spaces within the stream for advertisements to be added. The content provider may distribute the content feed to a number of different locations to be broadcast or otherwise transmitted to viewers.

Described herein are methods and systems for client-side video advertisement replacement using automatic content recognition.

Figure 1:
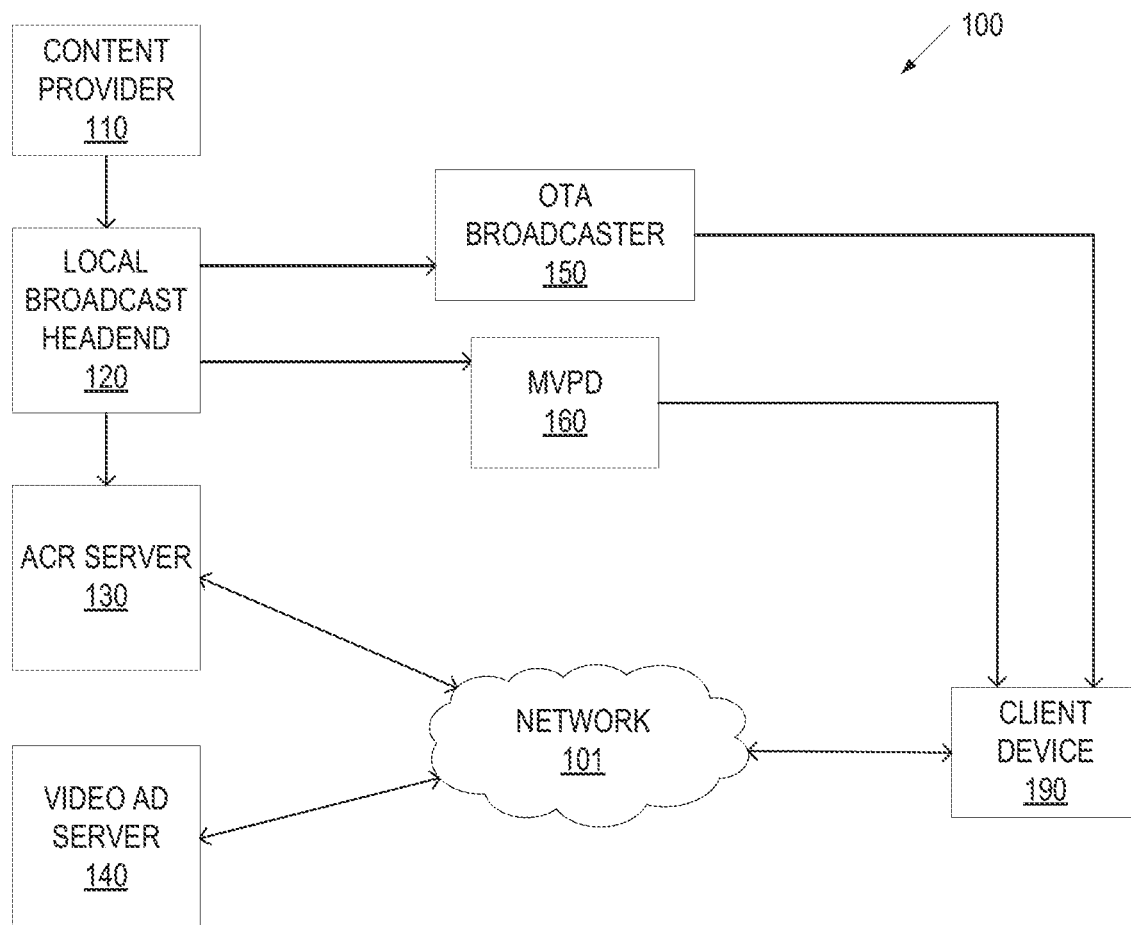
FIG. 1 illustrates a system diagram of a content distribution network according to one embodiment.

FIG. 1 illustrates a system diagram of a content distribution network 100 according to one embodiment. A local broadcast headend 120 receives an original broadcast feed from a content provider 110. The local broadcast headend 120 may generate a local broadcast feed based on the original broadcast feed. For example, the local broadcast headend 120 may be a local affiliate broadcaster receiving a network channel with programming and advertising slots that can be filled by the local affiliate broadcaster to create the local broadcast feed.

The local broadcast headend 120 may transmit the local broadcast feed to an over-the-air (OTA) broadcaster 150 which wirelessly transmits the local broadcast feed over the air to a client device 190. The local broadcast headend 120 may also or alternatively transmit the local broadcast feed to a multichannel video programming distributor (MVPD) 160 which transmits the local broadcast feed to the client device 190 via a cable, satellite, or telecommunications network.

The client device 190 may include an antenna to receive the local broadcast feed over the air from the OTA broadcaster 150. The client device 190 may also or alternatively include a set-top box to receive the local broadcast feed from the MVPD 160 over a cable, satellite, or telecommunications network. The client device 190 may include a display device, such as a television, to display the local broadcast feed (or an altered version of the local broadcast feed) to a viewer. Various components of the client device 190 may be integrated, such as in the form of a smart television, that includes an antenna, a set-top box, and a display device in a single unit.

The local broadcast headend 120 also provides the local broadcast feed to an automatic content recognition (ACR) server 130. As described in detail below, the ACR server 130 may instruct the client device 190, via a network 101 (such as the Internet), to replace portions of the local broadcast feed with replacement advertisements that the client device 190 can retrieve, via the network 101, from a video ad server 140. The ACR server may reside entirely within the local broadcaster headend 120, as a separate component remote from the local broadcaster headend 120, or functionality of the ACR server may be split between an ACR server component in the local broadcaster headend 120 and an ACR component residing on a remote server accessible via the network 101 as a "cloud" component.

Figure 2:
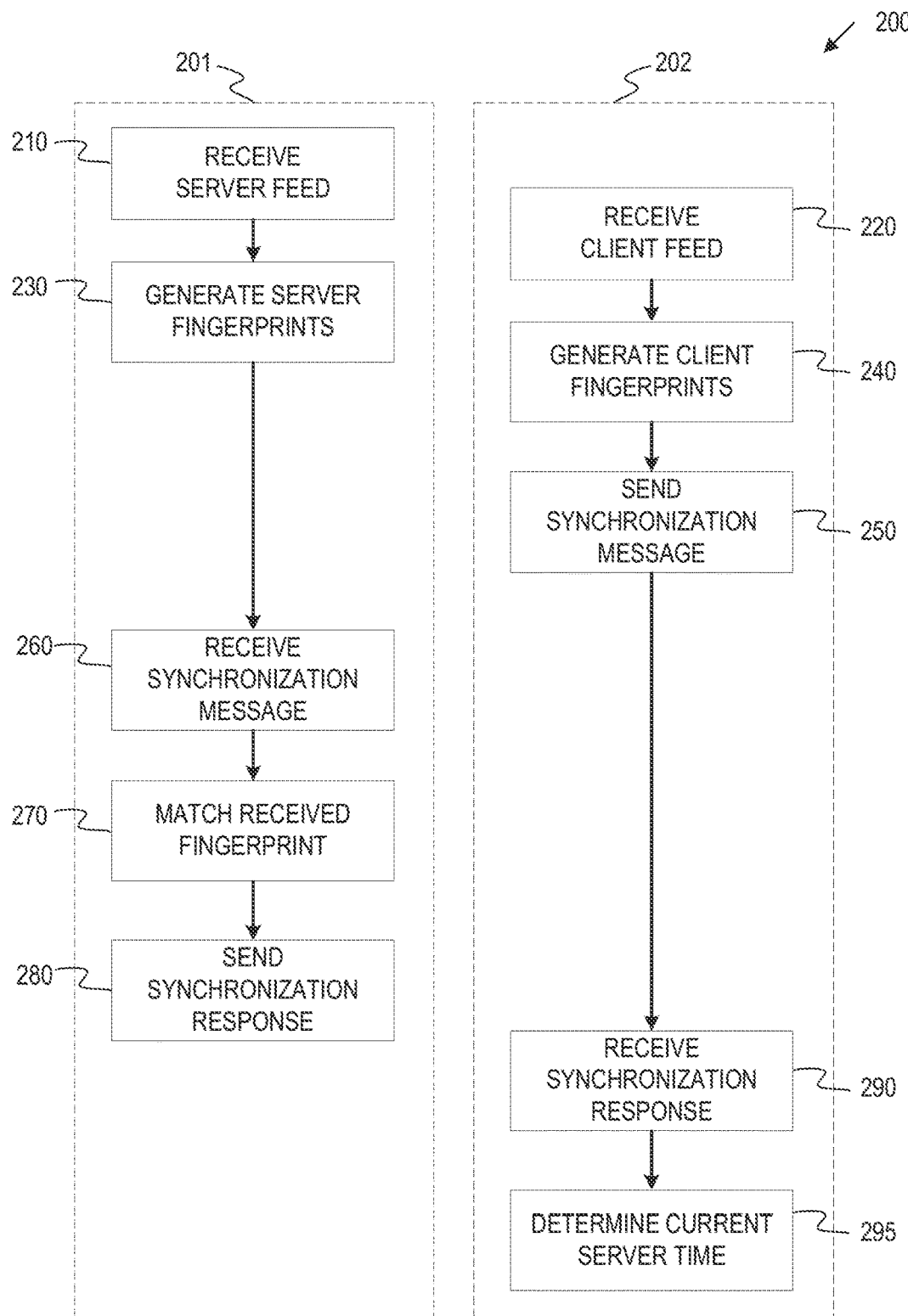
FIG. 2 illustrates a flowchart of a method of synchronizing a client device and a server device according to one embodiment.

FIG. 2 illustrates a flowchart of a method 200 of synchronizing a client device and a server device according to one embodiment. The method 200 may be at least partially performed by processing logic that may include hardware (e.g., circuitry, dedicated logic, programmable logic, microcode, etc.), software (e.g., instructions executed by a processing device), firmware or a combination thereof. The method includes a server-side method 201 that may be performed by processing logic of a server device, such as the ACR server 130 of FIG. 1, and a client-side method 202 that may be performed by processing logic of a client device, such as the client device 190 of FIG. 1.

The server-side method 201 begins, at block 210, with the reception of a server feed from a source device. The server feed may be, for example, a local broadcast feed received from a local broadcast headend. The server feed may be a video feed with a plurality of frames, each of the frames including a matrix of pixels representing an image.

The client-side method 202 begins, at block 220, with the reception of a client feed from the source device. The client feed may be, for example, a local broadcast feed received from a local broadcast headend via an over-the-air broadcaster or a MVPD. The client feed may include the same content as the server feed, but be a delayed and/or noisy version of the server feed.

The word "content" is often used colloquially to refer to media. However, content is more accurately used as a specific term in that it means the subject matter of the medium rather than the medium itself. Likewise, the word "media" and some compound words that include "media" (e.g. multimedia, hypermedia) are instead referring to content, rather than to the channel through which the information is delivered to the end user/audience. An example of a type of content commonly referred to as a type of media is a "motion picture" referred to as "a film."

The server-side method 201 continues, at block 230, with the generation of server fingerprints for segments of the server feed. The server fingerprints may be generated by fingerprinting every frame of the server feed, every other frame of the server feed, or by any other method. For example, the server device may generate a server fingerprint for a frame of the server feed by performing a discrete cosine transform (DCT) of the frame and designating a subset of the resulting coefficients (e.g., the low-frequency coefficients) as the fingerprint.

Each server fingerprint of a segment of the server feed may be associated with a server time. The server time may be a time of a server clock when the segment of the server feed was received by the server device. The server time may be a number of frames in the server feed from an arbitrary starting point. The server device may store the server fingerprints in association with the server time.

The client-side method 202 continues, at block 240, with the generation of client fingerprints for segments of the client feed. The client fingerprints may be generated in the same manner as the server fingerprints. Each client fingerprint of a segment of the client feed may be associated with a client time. The client time may be a time of a client clock when the segment of the client feed was received by the client device. The client time may be a number of frames in the server feed from an arbitrary starting point.

At block 250, the client-side method 202 continues with the sending of a synchronization message to the server device over a network. The network may be, for example, the Internet, and may be sent over a path different from that upon which the client feed was received. The synchronization message may include a client fingerprint and its associated client time. At block 260, the server-side method 201 continues with the reception of the synchronization message.

At block 270, the server-side method 201 continues with the matching of the client fingerprint in the synchronization message (received in block 260) to one of the server fingerprints (generated in block 230). The client fingerprint can be matched to a server fingerprint by correlating the client fingerprint to recently generated server fingerprints. If the correlation between the client fingerprint and a server fingerprint is greater than a threshold, it may be determined that the server fingerprint matches the client fingerprint.

At block 280, the server-side method 201 continues with the sending of a synchronization response over the network. The synchronization response may include the client time associated with the client fingerprint (received in block 260) and the server time associated with the matching server fingerprint (generated in block 230 and matched in block 270). In one embodiment, the synchronization response may include a synchronization offset determined as the difference between the client time associated with the client fingerprint and the server time associated with the matching server fingerprint. As described further below, the synchronization message may include other information, such as the server time of an upcoming advertisement slot, a length of the upcoming advertisement slot, and/or one or more server fingerprints of the frames immediately preceding the upcoming advertisement slot.

At block 290, the client-side method 202 continues with the reception of the synchronization response. At block 295, the client-side method 202 continues with the determination, by the client device, of the current server time. The client device may determine the current server time as the current client time adjusted by the synchronization offset. In one embodiment, the client device sets the client time to the current server time for future fingerprints and synchronization messages.

Figure 3:
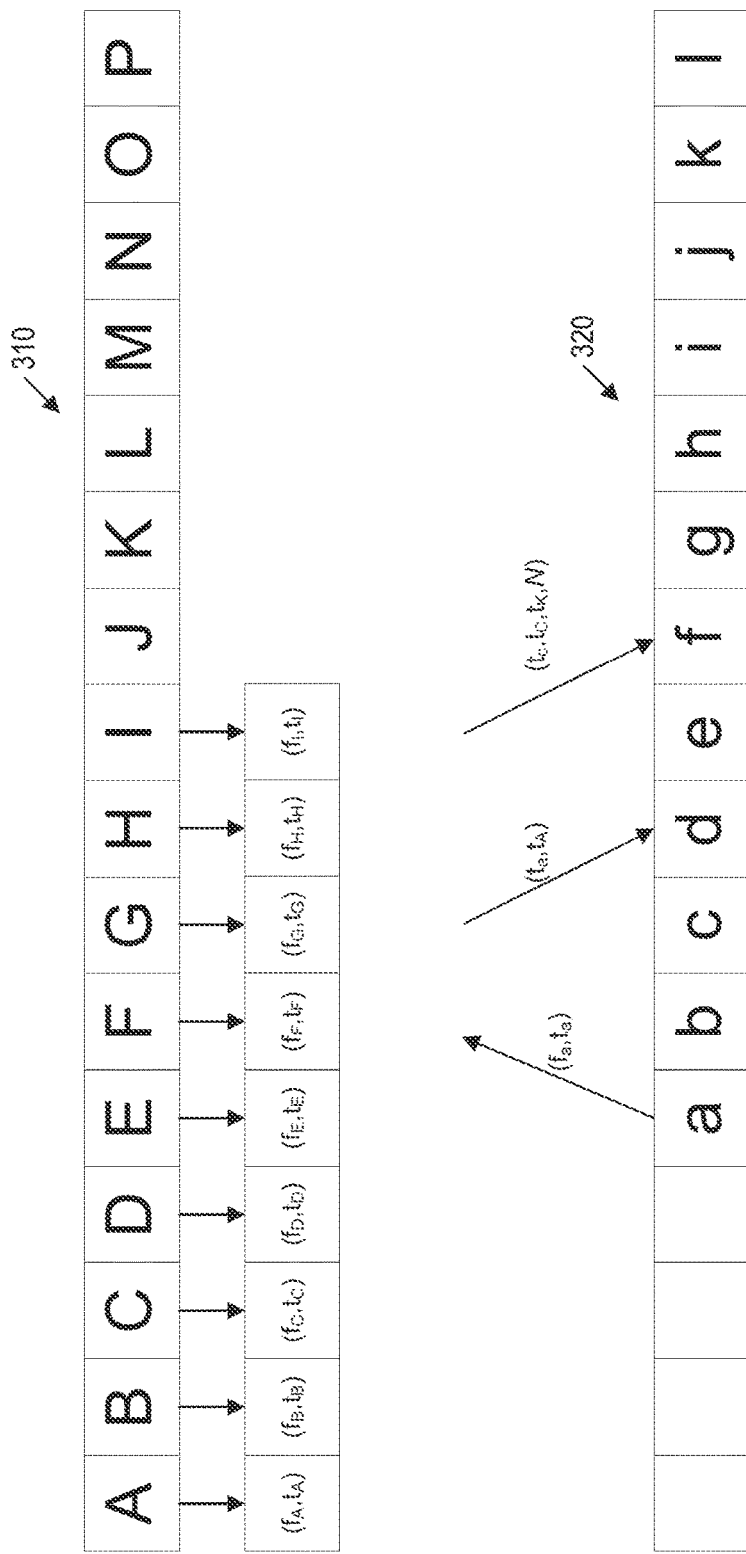
FIG. 3 illustrates a diagram of a local broadcast feed received as a server feed by a server device and as a client feed by a client device according to one embodiment.

An example operation of the method 200 of FIG. 2 is described below with respect to FIG. 3. FIG. 3 illustrates a diagram of a local broadcast feed received as a server feed 310 by a server device and as a client feed 320 by a client device.

The server feed 310 includes a plurality of server frames represented, by uppercase letters. The client feed 320 includes a plurality of client frames represented by lowercase letters. As noted above, the client feed 320 may include the same content as the server feed 310, but be a delays and/or noisy version of the content. Upon receiving the first frame (A) of the server feed, the server device generates a server fingerprint of the first frame ($f_A$) and determines an associated server time ($t_A$). Similarly, upon receiving the second frame (B) of the server feed, the server device generates a server fingerprint of the second frame ($f_A$) and determines an associated server time ($t_B$). The server device may generate a data point for each frame including a server fingerprint of the frame and an associated server time ($f_X$, $t_X$). The server device may store the data points in a local storage to match received client fingerprints. Alternatively, the server device may transmit the data points to a cloud-based computing system which receives synchronization messages from the client device or from various client devices, matches a client fingerprint of the synchronization message with one of the data points, and sends a synchronization response to the client device from which the synchronization message was received.

Upon receiving the first frame (a) of the client feed (at server time $t_E$ in FIG. 3h the client device generates a client fingerprint of the frame ($f_a$) and determines an associated client time ($t_a$). The client device then sends a synchronization message to the server device including the client fingerprint and the associated client time ($f_a$, $t_a$).

Upon receiving the synchronization message (at server time $t_F$ in FIG. 3), the server device searches for a server fingerprint that matches the received client fingerprint. In the embodiment of FIG. 3, the server device determines that the server fingerprint of the first frame ($f_A$) matches the received client fingerprint ($f_a$).

The server device sends a synchronization response to the client device including the associated server time of the matching server fingerprint ($t_A$) and the client time of the received client fingerprint ($t_a$). In another embodiment, the server device sends a synchronization response to the client device including a synchronization offset ($t_{offset}$) determined as the difference between the server time of the matching server fingerprint and the client time of the received client fingerprint ($t_A-t_a$).

As it takes time to transmit the synchronization message and receive the synchronization response, the synchronization message may be received by the client device at a client time later than $t_a$. The client device determines the current server time by adding the synchronization offset to the current client time. For example, the synchronization message may be received at client time $t_d$ (as shown in FIG. 3) and the client device may determine the current server time (e.g., to in FIG. 3) as $t_d+t_A-t_a$. In one embodiment, the client device may set the current client time to the current server time, thereby synchronizing the client device and the server device. In another embodiment, the client device may track the server time separately from the client time, thereby synchronizing the client device and the server device.

With the client device and the server device synchronized, at least in the sense that the client device knows the current server time, the client device may receive instructions referencing the server time and implement them at the appropriate client time.

For example, the client device may receive an instruction from the server device to replace a segment of the local broadcast feed beginning at server time $t_K$ and a length of N frames with a replacement advertisement. The client device may receive this instruction as pan of the synchronization response.

For example, as shown in FIG. 3, the client device receives a synchronization response indicating that client time $t_c$ corresponds to server time $t_C$ and that an advertisement is to be played in the feed corresponding to server time $t_K$. In response, the client device may begin to retrieve or buffer an advertisement from a video ad server. At client time $t_k$, determined as $t_K-t_C+t_c$, the client device displays the advertisement rather than the local broadcast feed.

In one embodiment, the synchronization response further includes the server fingerprint of the frame preceding the replacement of the advertisement, e.g., $f_j$. Thus, as the client device generates client fingerprints, it compares the client fingerprints to the received server fingerprint to more accurately determine when to start displaying the replacement advertisement.

Figure 4:
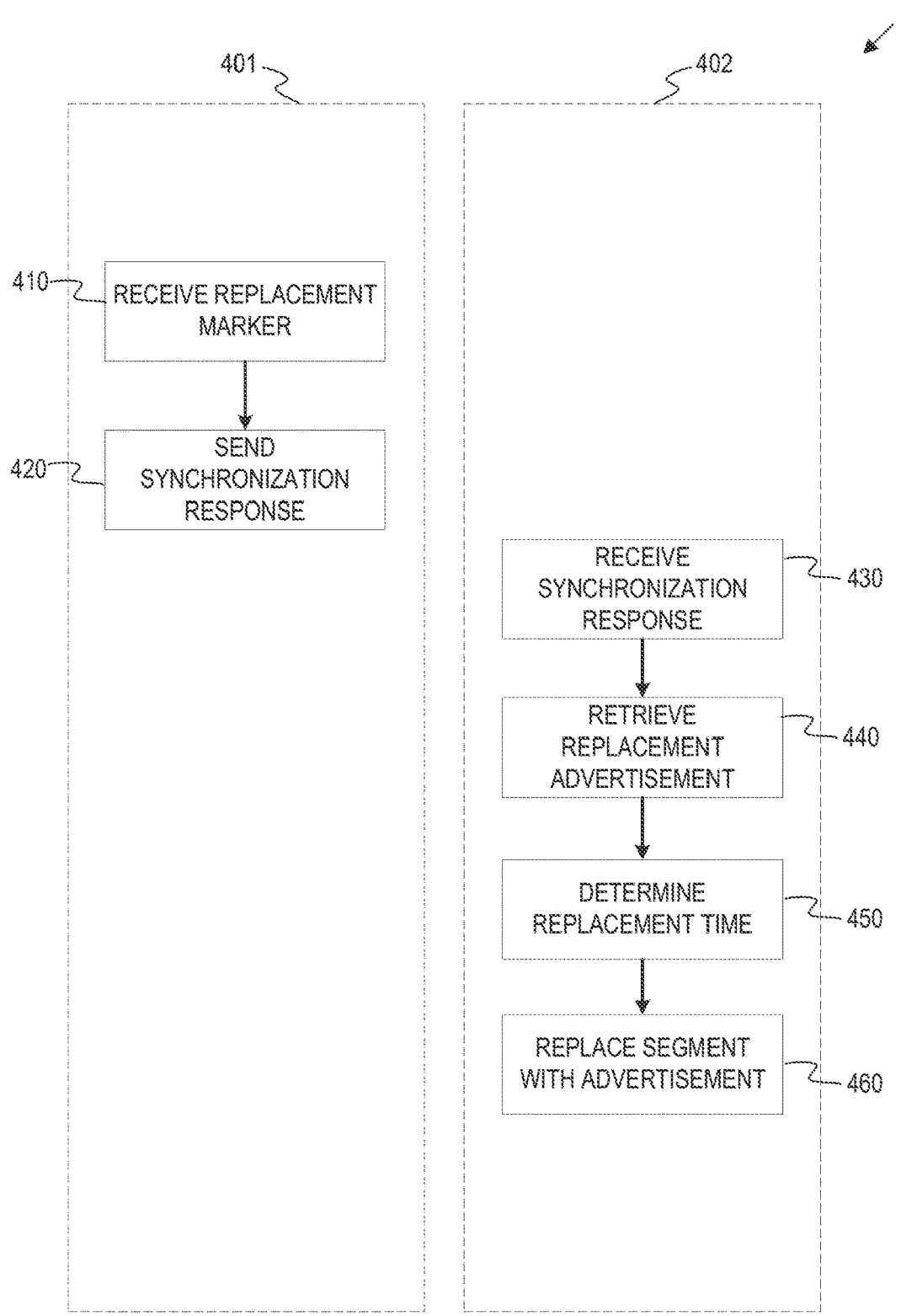
FIG. 4 illustrates a flowchart of a method of replacing a segment of a feed with a replacement advertisement according to one embodiment.

FIG. 4 illustrates a flowchart of a method 400 of replacing a segment of a feed with a replacement advertisement according to one embodiment. The method 400 may be at least partially performed by processing logic that may include hardware (e.g., circuitry, dedicated logic, programmable logic, microcode, etc.), software (e.g., instructions executed by a processing device), firmware or a combination thereof. The method includes a server-side method 401 that may be performed by processing logic of a server device, such as the ACR server 130 of FIG. 1, and a client-side method 402 that may be performed by processing logic of a client device, such as the client device 190 of FIG. 1.

The server-side method 401 begins, at block 410, with the reception of a replacement marker. The server may receive the replacement marker from a local broadcast headend as part of or separate from the local broadcast feed. The replacement marker may indicate a segment of the local broadcast feed that can be replaced with a replacement advertisement. The replacement marker may indicate that a currently received segment of the local broadcast feed may be replaced. The replacement marker may indicate that an upcoming segment of the local broadcast feed may be replaced. Thus, the replacement marker may include an offset indicating an amount of time between a current segment and the upcoming segment that may be replaced.

At block 420, the server device sends a synchronization response to the client device. The synchronization response may be sent as described above with respect to the method 200 of FIG. 2. In particular, the synchronization response may be sent in response to receiving a synchronization message from the client device. It is to be appreciated that the method 200 of FIG. 2 and the method 400 of FIG. 4 may be performed together.

The client-side method 402 begins, at block 430, with the reception of the synchronization response. The synchronization response may indicate a client time, a corresponding server time, a server time of a segment to be replaced, a length of the segment to be replaced, and a server fingerprint of the frame immediately preceding the segment to be replaced.

At block 440, in response to receiving a synchronization response indicating that an upcoming segment is to be replaced, the client device begins to retrieve a replacement advertisement from a video ad server targeted at the requesting display device. In another embodiment, the display device may retrieve a replacement advertisement from the video ad server prior to receiving a synchronization response indicating that an upcoming segment is to be replaced. Thus, retrieving the replacement advertisement may include retrieving the replacement advertisement from local storage of the client device.

At block 450, the client device determines a replacement time, a time at which the display device will stop displaying the client feed and, instead, display the replacement advertisement. The replacement timing may be based on the information received in the synchronization response as described above with respect to FIG. 3. The replacement time may also be based on matching the server fingerprints of one or more frames immediately preceding the segment to be replaced with client fingerprints of the feed. Thus, an approximate replacement time may be determined based on the server time receiving in the synchronization response, and a true replacement time may be determined when the server fingerprints of one or more frames immediately preceding the segment to be replaced matches the client fingerprints generated at the client device.

At block 460, the client device displays the replacement advertisement at the determined replacement time. When the length of time indicated by the synchronization response has passed, the client device returns to displaying the client feed.

Figure 5:
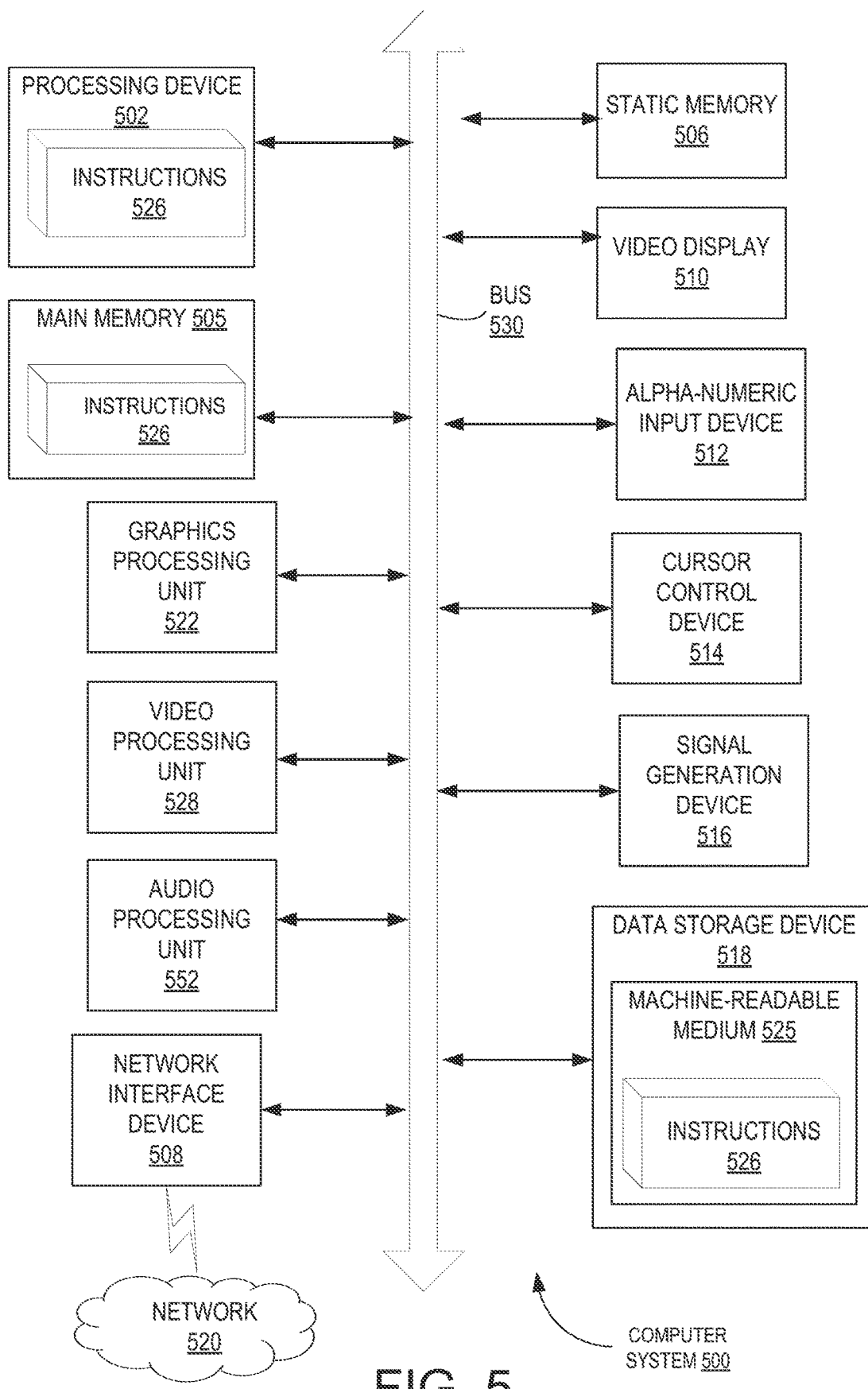
FIG. 5 illustrates a diagrammatic representation of a machine in the example form of a computer system within which a set of instructions, for causing the machine to perform any one or more of the methodologies discussed herein, may be executed.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 may correspond to the ACR server 130 of FIG. 1 and execute instructions for performing at least one of the server-side method 201 of FIG. 2 and the server-side method 401 of FIG. 4. The computer system 500 may correspond to the client device 190 of FIG. 1 and execute instructions for performing at least one of the client-side method 202 of FIG. 2 and the client-side method 402 of FIG. 4. The computer system 500 may correspond to at least a portion of a cloud-based computer system and execute instructions for performing at least part of the server-side method 201 of FIG. 2 and the server-side method 401 of FIG. 4.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CSC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In one embodiment, processing device 502 may include one or more processing cores. The processing device 502 is configured to execute the instructions 526 of a mirroring logic for performing the operations discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a signal generation device 516 (e.g., a speaker), or other peripheral devices. Furthermore, computer system 500 may include a graphics processing unit 522, a video processing unit 528, and an audio processing unit 532. In another embodiment, the computer system 500 may include a chipset (not illustrated), which refers to a group of integrated circuits, or chips, that are designed to work with the processing device 502 and controls communications between the processing device 502 and external devices. For example, the chipset may be a set of chips on a motherboard that links the processing device 502 to very high-speed devices, such as main memory 504 and graphic controllers, as well as linking the processing device 502 to lower-speed peripheral buses of peripherals, such as USB, PCI or ISA buses.

The data storage device 518 may include a computer-readable storage medium 524 on which is stored instructions 526 embodying any one or more of the methodologies of functions described herein. The instructions 526 may also reside, completely or at least partially, within the main memory 504 and/or within the processing device 502 during execution thereof by the computer system 500; the main memory 504 and the processing device 502 also constituting computer-readable storage media.

The computer-readable storage medium 524 may also be used to store instructions 526 utilizing logic and/or a software library containing methods that call the above applications. While the computer-readable storage medium 524 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones. Internet protocol devices, smartphones, digital cameras, personal digital assistants (PDAs), and handheld PCs Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are these requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing." "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks. CD-ROMs and magnetic-optical disks, read, only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or am presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, at a client device, a client feed comprising media content from a source device;
   generating, by the client device, at least one client fingerprint for at least one segment of the received client feed;
   sending a synchronization message comprising the at least one client fingerprint from the client device to a server device, wherein the server device is configured to identify a corresponding at least one server fingerprint generated by the server device for a corresponding segment of a server feed that matches the at least one client fingerprint;
   receiving, at the client device, a synchronization response from the server device, the synchronization response comprising:
      data indicative of a time difference between a server feed time associated with the identified at least one server fingerprint that matches the at least one client fingerprint and a client feed time associated with the at least one client fingerprint; and an upcoming server time for an upcoming segment to be replaced; and determining, by the client device, a replacement time of the client feed for the segment to be replaced based on at least the upcoming server time and the time difference; and replacing, by the client device, the segment to be replaced in the client feed with a replacement advertisement at the replacement time.

2. The method of claim 1, wherein the synchronization response from the server device further comprises a preceding server fingerprint of at least one frame that immediately precedes the upcoming server segment to be replaced.

3. The method of claim 2, wherein determining, by the client device, the replacement time of the client feed for the segment to be replaced further comprises:

determining, by the client device, when the client device generates a corresponding preceding client fingerprint of the client feed that matches the preceding server fingerprint received from the server device.

4. The method of claim 1, wherein the synchronization response from the server device further comprises a length of the segment to be replaced.

5. The method of claim 1, further comprising:

retrieving, by the client device, the replacement advertisement in response to receiving the synchronization response from the server device.

6. The method of claim 1, further comprising:

generating, by the client device, a sequence of client fingerprints for segments of the received client feed, each client fingerprint comprising a corresponding segment and a corresponding client feed time indicating when the corresponding segment was received by the client device.

7. The method of claim 6, further comprising, in response to generating each client fingerprint:

sending a corresponding synchronization message comprising a most recent generated client fingerprint from the client device to the sever device; and receiving, at the client device, a corresponding synchronization response from the server device.

8. A client device comprising:

a processing device;

a memory in communication with the processing device, wherein the memory stores instructions that, when executed by the processing device, cause the processing device to perform operations comprising:

receiving a client feed comprising media content from a source device;

generating at least one client fingerprint for at least one segment of the received client feed;

sending a synchronization message comprising the at least one client fingerprint from the client device to a server device, wherein the server device is configured to identify a corresponding at least one server fingerprint generated by the server device for a corresponding segment of a server feed that matches the at least one client fingerprint;

receiving a synchronization response from the server device, the synchronization response comprising:

data indicative of a time difference between a server feed time associated with the identified at least one server fingerprint that matches the at least one client fingerprint and a client feed time associated with the at least one client fingerprint; and an upcoming server time for an upcoming segment to be replaced; and determining a replacement time of the client feed for the segment to be replaced based on at least the upcoming server time and time difference; and replacing the segment to be replaced in the client feed with a replacement advertisement at the replacement time.

9. The client device of claim 8, wherein the synchronization response from the server device further comprises a preceding server fingerprint of at least one frame that immediately precedes the upcoming server segment to be replaced.

10. The client device of claim 9, wherein determining the replacement time of the client feed for the segment to be replaced further comprises:

determining when the client device generates a corresponding preceding client fingerprint of the client feed that matches the preceding server fingerprint received from the server device.

11. The client device of claim 8, wherein the synchronization response from the server device further comprises a length of the segment to be replaced.

12. The client device of claim 8, wherein the operations further comprise:

retrieving the replacement advertisement in response to receiving the synchronization response from the server device.

13. The client device of claim 8, wherein the operations further comprise:

generating a sequence of client fingerprints for segments of the received client feed, each client fingerprint comprising a corresponding segment and a corresponding client feed time indicating when the corresponding segment was received by the client device;

sending a corresponding synchronization message comprising a most recent generated client fingerprint from the client device to the sever device; and receiving a corresponding synchronization response from the server device.

14. A non-transitory computer-readable medium comprising instruction which, when executed by a processing device in a client device, cause the processing device to perform operations comprising:

receiving a client feed comprising media content from a source device;

generating at least one client fingerprint for at least one segment of the received client feed;

sending a synchronization message comprising the at least one client fingerprint from the client device to a server device, wherein the server device is configured to identify a corresponding at least one server fingerprint generated by the server device for a corresponding segment of a server feed that matches the at least one client fingerprint;

receiving a synchronization response from the server device, the synchronization response comprising:

data indicative of a time difference between a server feed time associated with the identified at least one server fingerprint that matches the at least one client fingerprint and a client feed time associated with the at least one client fingerprint; and an upcoming server time for an upcoming segment to be replaced; and determining a replacement time of the client feed for the segment to be replaced based on at least the upcoming server time and time difference; and replacing the segment to be replaced in the client feed with a replacement advertisement at the replacement time.

15. The non-transitory computer-readable medium of claim 14, wherein the synchronization response from the server device further comprises a preceding server fingerprint of at least one frame that immediately precedes the upcoming server segment to be replaced.

16. The non-transitory computer-readable medium of claim 15, wherein determining the replacement time of the client feed for the segment to be replaced further comprises:
    determining when the client device generates a corresponding preceding client fingerprint of the client feed that matches the preceding server fingerprint received from the server device.

17. The non-transitory computer-readable medium of claim 14, wherein the synchronization response from the server device further comprises a length of the segment to be replaced.

18. The non-transitory computer-readable medium of claim 14, wherein the operations further comprise:
    retrieving the replacement advertisement in response to receiving the synchronization response from the server device.

19. The non-transitory computer-readable medium of claim 14, wherein the operations further comprise:
    generating a sequence of client fingerprints for segments of the received client feed, each client fingerprint comprising a corresponding segment and a corresponding client feed time indicating when the corresponding segment was received by the client device;
    sending a corresponding synchronization message comprising a most recent generated client fingerprint from the client device to the sever device; and
    receiving, at the client device, a corresponding synchronization response from the server device.

* * * * *